US012680825B2

(12) United States Patent
Oe et al.

(10) Patent No.: US 12,680,825 B2
(45) Date of Patent: Jul. 14, 2026

(54) NAVIGATION SYSTEM AND NAVIGATION METHOD

(71) Applicants: TOYOTA JIDOSHA KABUSHIKI KAISHA, Toyota (JP); Nomura Research Institute, Ltd., Tokyo (JP)

(72) Inventors: Yoshihiro Oe, Nagoya (JP); Wataru Minoura, Nagoya (JP); Masatoshi Hayashi, Nisshin (JP); Yutaro Imamura, Nagoya (JP); Fumihiro Nasu, Nagoya (JP); Yuki Tatsumoto, Seto (JP); Takehiko Hashimoto, Chiyoda-ku (JP)

(73) Assignees: TOYOTA JIDOSHA KABUSHIKI KAISHA, Toyota (JP); Nomura Research Institute, Ltd., Tokyo (JP)

( * ) Notice: Subject to any disclaimer, the term of this patent is extended or adjusted under 35 U.S.C. 154(b) by 98 days.

(21) Appl. No.: 18/645,134

(22) Filed: Apr. 24, 2024

(65) Prior Publication Data

US 2024/0377214 A1     Nov. 14, 2024

(30) Foreign Application Priority Data

May 11, 2023    (JP) ................................. 2023-078884

(51) Int. Cl.
*G01C 21/36*          (2006.01)
(52) U.S. Cl.
CPC ................................ *G01C 21/3647* (2013.01)
(58) Field of Classification Search
CPC ................................................. G01C 21/3647
See application file for complete search history.

(56) References Cited

U.S. PATENT DOCUMENTS

| | | | |
|---|---|---|---|
| 2002/0082773 A1* | 6/2002 | Ikeuchi ................. | G09B 29/10 |
| | | | 701/410 |
| 2017/0082451 A1* | 3/2017 | Liu ...................... | G11B 27/031 |
| 2017/0089714 A1* | 3/2017 | Liu ........................ | G01S 19/42 |
| 2022/0146274 A1 | 5/2022 | Nakagami | |

FOREIGN PATENT DOCUMENTS

JP          2022-077296 A       5/2022

* cited by examiner

*Primary Examiner* — Scott A Browne
*Assistant Examiner* — Izcalli Rios-Aguirre
(74) *Attorney, Agent, or Firm* — Finnegan, Henderson, Farabow, Garrett & Dunner LLP

(57)          ABSTRACT

In a navigation system, a data center is connected to a plurality of vehicles via a communication network. The data center receives video data and stores the received video data in a storage device, the received video data being data of a video captured by a drive recorder and provided from a first vehicle among the plurality of vehicles, the first vehicle having a destination that is set such that route guidance until arrival at the destination cannot be accomplished by the navigation device, the first vehicle having arrived at the destination. The data center transmits the video data stored in the storage device to a second vehicle among the plurality of vehicles, the second vehicle having the destination set in the navigation device. The navigation device of the second vehicle performs guidance to the destination by replaying the received video after the route guidance around the destination is terminated.

6 Claims, 4 Drawing Sheets

NAVIGATION SYSTEM AND NAVIGATION METHOD

CROSS-REFERENCE TO RELATED APPLICATION

This application claims priority to Japanese Patent Application No. 2023-078884 filed on May 11, 2023, incorporated herein by reference in its entirety.

BACKGROUND

1. Technical Field

The present disclosure relates to a navigation system and a navigation method.

2. Description of Related Art

A navigation system is disclosed in Japanese Unexamined Patent Application Publication No. 2022-77296 (JP 2022-77296 A). This navigation system includes a navigation device installed in a vehicle. The navigation system displays a route on the display of the navigation device so as to show an occupant the route.

SUMMARY

When there is no information regarding a road to the destination, for example, in the case in which the destination is located at the end of a mountain road or the like, the navigation system terminates the route guidance on the way to the destination because the route guidance to the destination cannot be performed any longer. There are errors in position information used by the navigation system. For this reason, the navigation system terminates the route guidance around the destination in order to avoid misguidance to a wrong point. For example, when the destination is located in a residential area where buildings are densely present, the navigation system terminates the route guidance around the destination.

It has been desired to provide a navigation system and a navigation method capable of performing guidance to a destination while preventing misguidance to a wrong point.

Hereinafter, description will be provided on means, and operation and effects for solving the above problems.

A navigation system for solving the above problems is a navigation system configured by connecting, via a communication network, a data center including a storage device and a processing device to a plurality of vehicles each including a drive recorder and a navigation device. In this navigation system, the processing device of the data center receives video data and stores the received video data in the storage device, the received video data being provided from a first vehicle among the plurality of vehicles, the first vehicle having a destination set in the navigation device such that route guidance until arrival at the destination cannot be accomplished by the navigation device, the first vehicle having arrived at the destination, the received video data being data of a video captured by the drive recorder during a time period from termination of the route guidance until the arrival of the first vehicle at the destination. The processing device of the data center transmits the video data stored in the storage device to a second vehicle among the plurality of vehicles, the second vehicle having the destination set in the navigation device. The navigation device of the second vehicle that has received the video data performs the route guidance to the destination by replaying a video of the video data after route guidance around the destination is terminated.

A navigation method for solving the above problems is a navigation method in a navigation system configured by connecting, via a communication network, a data center including a storage device and a processing device to a plurality of vehicles each including a drive recorder and a navigation device. The navigation method includes a first step of causing the processing device of the data center to receive a video and store the received video in the storage device, the received video being provided from a first vehicle among the plurality of vehicles, the first vehicle having a destination set in the navigation device such that route guidance until arrival at the destination cannot be accomplished by the navigation device, the first vehicle having arrived at the destination, the received video being captured by the drive recorder during a time period from termination of the route guidance until the arrival of the first vehicle at the destination. The navigation method includes a second step of causing the processing device of the data center to transmit the video stored in the storage device to a second vehicle among the plurality of vehicles, the second vehicle having the destination set in the navigation device. The navigation method includes a third step of causing the navigation device of the second vehicle to perform the route guidance to the destination by replaying the video after route guidance around the destination is terminated.

This navigation system and this navigation method can perform guidance to the destination while preventing misguidance to a wrong point.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, one embodiment of a navigation system will be described with reference to FIGS. 1 to 6.

Configuration of Navigation System 10

Figure 1:
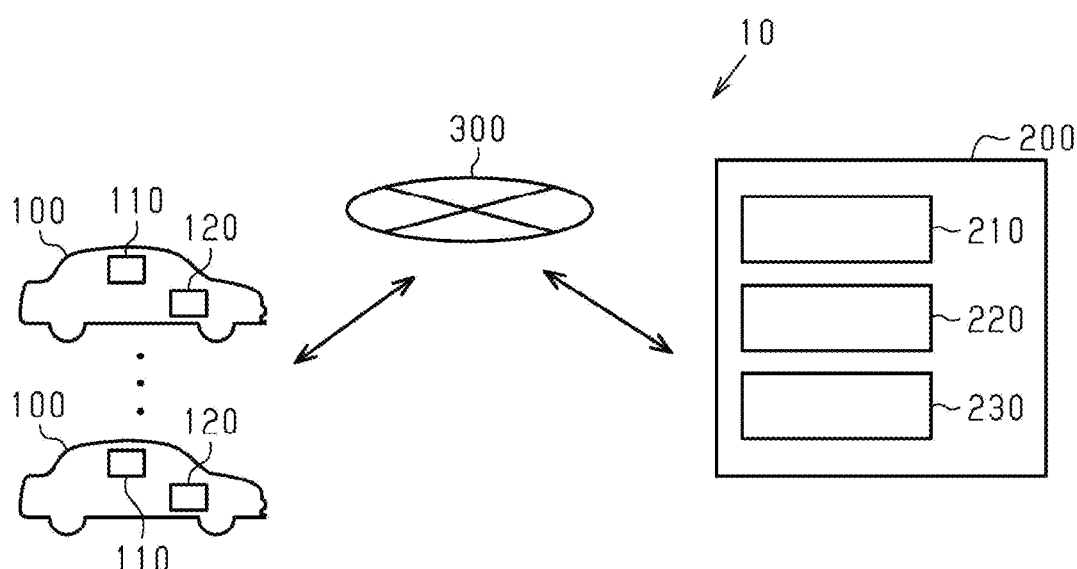
FIG. 1 is a schematic diagram showing the configuration of a navigation system in one embodiment.

As shown in FIG. 1, a navigation system 10 includes a plurality of vehicles 100 and a data center 200. The data center 200 is communicably connected to the plurality of vehicles 100 via a communication network 300. Each vehicle 100 includes a drive recorder 110 and a navigation device 120.

Figure 2:
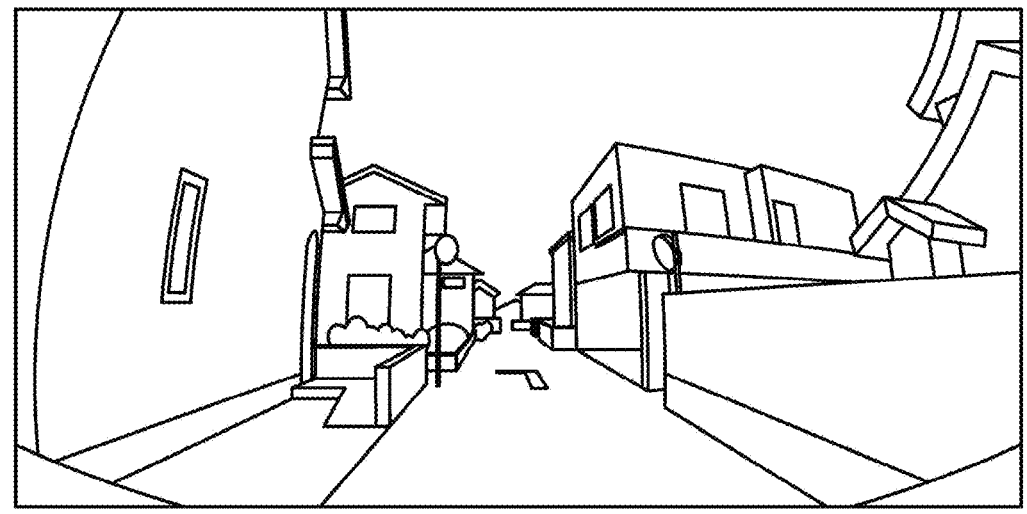
FIG. 2 is a view showing an example of an image of a drive recorder in the navigation system of the embodiment.

FIG. 2 shows an example of a video captured by the drive recorder 110. As shown in FIG. 2, the drive recorder 110 shoots and records a video in front of the vehicle that is seen from a driving seat. The navigation device 120 includes a receiver of a satellite positioning system, a communication device, a display, an input device, and a storage device that stores data such as map information.

The drive recorder 110 and the navigation device 120 are connected such that these devices can exchange information with each other. The drive recorder 110 stores information regarding a shooting date and position information regarding a shooting point together with the video data of the captured video.

The data center 200 includes: a storage device 220 that stores programs; and a processing device 210 that executes the programs stored in the storage device 220 to perform various processing. Note that the processing device 210 includes a processor.

The data center 200 includes a communication device 230. The communication device 230 is implemented as hardware such as a network adapter, various types of communication software, or a combination of both. The communication device 230 is configured to realize wired or wireless communication via the communication network 300. The data center 200 may be configured by using a plurality of computers. For example, the data center 200 may be configured by a plurality of server devices.

The position information provided by the satellite positioning system used by the navigation device 120 has an error of several meters, for example. Hence, the navigation device 120 might terminate route guidance around a destination to avoid misguidance to a wrong point. In a residential area where buildings are densely present, such as a location where the video shown in FIG. 2 is captured, the navigation device 120 terminates the route guidance around the destination.

After terminating the route guidance around the destination, the navigation system 10 performs the guidance to the destination by replaying, on the navigation device 120, a video captured by the drive recorder 110 of another vehicle 100.

More specifically, in the navigation system 10, the data center 200 receives, from a first vehicle 101, video data of the video captured by the drive recorder 110 during a time period from the termination of the route guidance until the arrival at the destination, and stores the video data in the storage device 220. The first vehicle 101 is a vehicle 100 among the plurality of vehicles 100, the vehicle 100 having a destination set in the navigation device 120 such that the route guidance until the arrival at this destination cannot be accomplished, and this vehicle has arrived at this destination. The data center 200 transmits the video data stored in the storage device 220 to the second vehicle 102. The second vehicle 102 is a vehicle 100 among the plurality of vehicles 100, the vehicle 100 having the destination set in the navigation device 120. After terminating the route guidance around the destination, the navigation device 120 of the second vehicle 102 performs the route guidance to the destination by replaying the video.

Transmission And Reception of Video Data in Navigation System 10

Next, transmission and reception of the video data between the data center 200, and the first vehicle 101 and the second vehicle 102 will be described with reference to FIG. 3.

Figure 3:
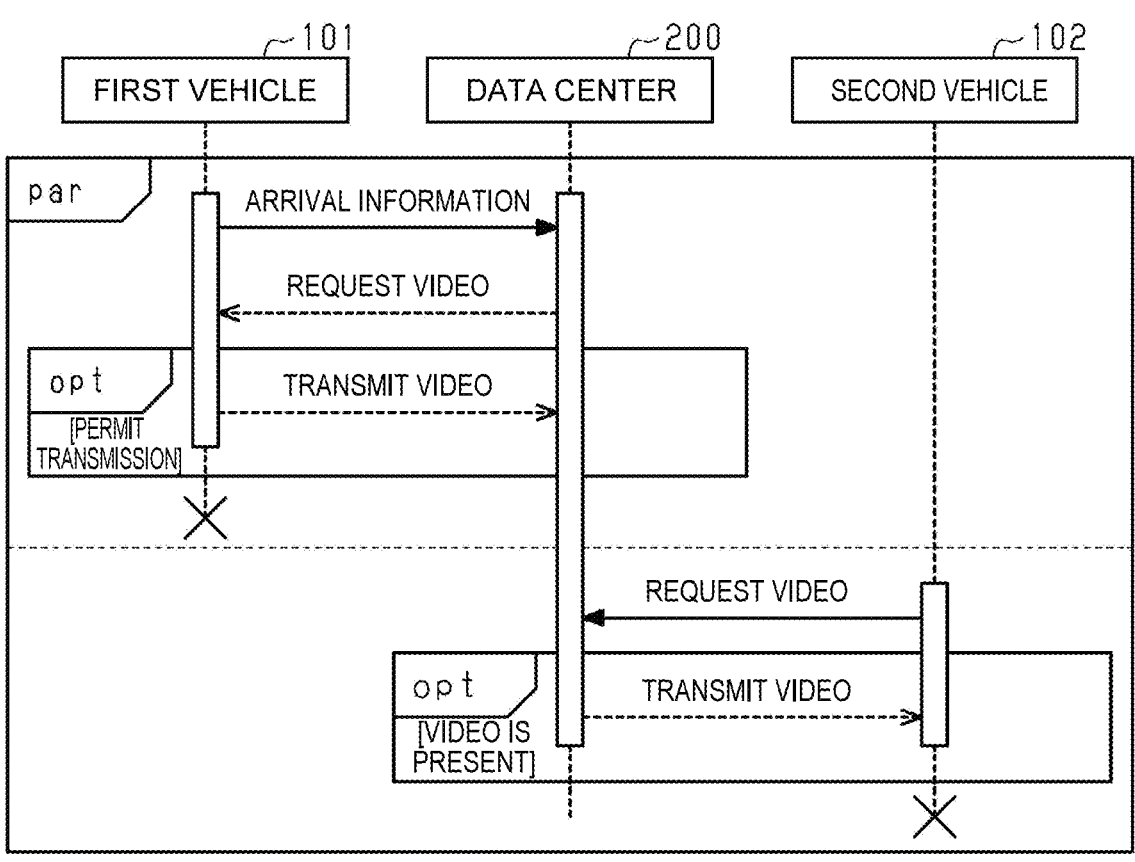
FIG. 3 is a view of a sequence showing a flow of processing among a data center, a first vehicle, and a second vehicle in the navigation system of the embodiment.

As shown in FIG. 3, in the navigation system 10, the data center 200 transmits and receives the video data to and from the first vehicle 101 and the second vehicle 102. This enables the navigation system 10 to provide the second vehicle 102 with the video data of the video captured by the drive recorder 110 of the first vehicle 101.

As shown in FIG. 3, processing of receiving the video data from the first vehicle 101 and processing of providing the video data to the second vehicle 102 are performed in parallel.

As shown in the upper part of FIG. 3, in the processing of receiving the video data from the first vehicle 101, the first vehicle 101 first transmits arrival information indicating the arrival at the set destination to the data center 200. The data center 200 that has received the arrival information transmits a video request to request provision of the video data to the first vehicle 101. When transmission of the video data is permitted in the first vehicle 101 that has received the video request, the first vehicle 101 transmits the video data to the data center 200. The data center 200 that has received the video data stores the received video data in the storage device 220.

As shown in the lower part of FIG. 3, in the processing of providing the video data to the second vehicle 102, the second vehicle 102 transmits a video request to request provision of the video data to the data center 200. When video data corresponding to the video requested by the second vehicle 102 is stored in the storage device 220, the data center 200 transmits the corresponding video data to the second vehicle 102.

Hereinafter, with reference to FIGS. 4 to 6, the flow of the processing executed in the vehicle 100 and the flow of the processing executed in the data center 200, in order to realize the above-described guidance using the video, will be described more specifically.

Processing Executed by Navigation Device 120 of Vehicle 100

Figure 4:
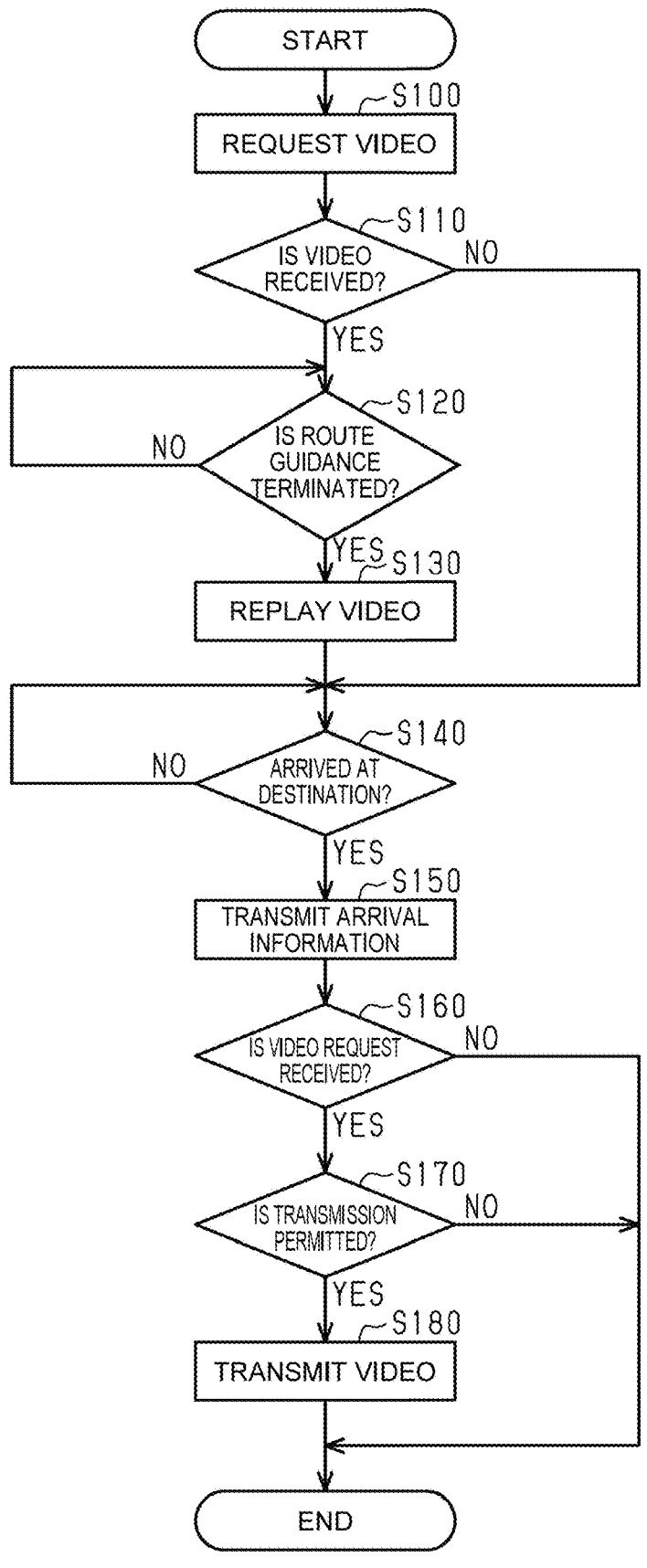
FIG. 4 is a flowchart showing a flow of processing executed by a navigation device of a vehicle in the navigation system of the embodiment.

FIG. 4 shows the flow of a series of processing executed in the vehicle 100. This series of processing is executed by the navigation device 120 of the vehicle 100. This series of processing is executed when a destination around which the route guidance using the satellite positioning system is to be terminated is set. This series of processing is executed in parallel with the route guidance using the satellite positioning system by the navigation device 120.

As shown in FIG. 4, when this series of processing is started, the navigation device 120 first transmits a video request to request provision of the video data to the data center 200 in the process of step S100. Specifically, the navigation device 120 transmits a signal including information regarding the set destination to the data center 200 as the video request.

Next, in the process of step S110, the navigation device 120 determines whether or not the video data is received. In the process of step S110, when the navigation device 120 determines that the video data is received (YES in step S110), the process proceeds to step S120. The video data received by the navigation device 120 is video data provided by the first vehicle 101 that has arrived at the same destination as the destination set in the navigation device 120, as will be described later.

In the process of step S120, the navigation device 120 determines whether or not the route guidance is terminated. When the route guidance is not yet terminated (No in step S120), the process of step S120 is repeated. When the route guidance is terminated around the destination (YES in step S120), the process proceeds to step S130.

In the process of step S130, the navigation device 120 performs the guidance by replaying the video received from the data center 200. At this time, the navigation device 120 adjusts the replaying speed of the video in accordance with the speed of the vehicle 100 such that an image captured at a position that the vehicle 100 will pass a few seconds later is displayed on the display. This enables a driver of the vehicle 100 to check the route where the first vehicle 101 has actually traveled with this video. After starting the guidance by replaying the video in this manner, the process proceeds to step S140.

On the other hand, in the process of step S110, when the navigation device 120 determines that the video data cannot be received (No in step S110), the process also proceeds to step S140. That is, when the requested video data cannot be received from the data center 200, the navigation device 120 cannot perform the guidance by replaying the video. Hence, the navigation device 120 directly advances the process to step S140 without executing the guidance by replaying the video.

In the process of step S140, the navigation device 120 determines whether or not the vehicle has arrived at the destination. For example, the navigation device 120 determines that the vehicle 100 has arrived at the destination when a parking position of the vehicle 100 is located at a position corresponding to the destination and the main switch of the vehicle 100 is turned off. The position corresponding to the destination is a position of the vehicle 100 ascertained using the satellite positioning system located within a range of, for example, several meters from the destination.

In the process of step S140, when the navigation device 120 determines that the vehicle has not yet arrived at the destination (No in step S140), the process of step $140 is repeated. In the process of step S140, when the navigation device 120 determines that the vehicle has arrived at the destination (YES in step S140), the process proceeds to step S150. In the process of step S150, the navigation device 120 transmits arrival information to the data center 200. The arrival information includes information regarding the set destination.

In the process of next step S160, the navigation device 120 determines whether or not the video request is received from the data center 200. In the process of step S160, when the navigation device 120 determines that the video request is received (YES in step S160), the process proceeds to step $170.

In the process of step S170, the navigation device 120 determines whether or not transmission of the video data is permitted. When receiving the video request, the navigation device 120 asks the driver whether or not to permit the transmission of the video data. For example, the navigation device 120 displays, on the display, a message of asking the driver to answer whether or not to permit the request. In response to this inquiry, when the driver performs an operation of indicating an intention to permit the transmission, the navigation device 120 determines that the transmission of the video data is permitted. On the other hand, when the driver performs an operation of indicating an intention not to permit the transmission, the navigation device 120 determines that the transmission of the video data is not permitted.

In the process of step S170, when the navigation device 120 determines that the transmission of the video data is permitted (step S170: YES), the process proceeds to step S180. In the process of step S180, the navigation device 120 transmits the video data to the data center 200. The video data for the transmission is data of a video captured by the drive recorder 110 during a time period from the termination of the route guidance around the destination until the arrival of the vehicle 100 at the destination.

After transmitting the video data to the data center 200 through the process of step S180, the navigation device 120 terminates this series of processing.

In the process of step S160, when the navigation device 120 determines that the video request is not received (NO in step S160), the navigation device 120 terminates this series of processing without executing the process of steps S170 and the process of S180. That is, when the video request from the data center 200 is not made, the navigation device 120 terminates this series of processing without transmitting the video data to the data center 200.

In the process of step S170, when the navigation device 120 determines that the transmission of the video data is not permitted (No in step S170), the navigation device 120 terminates this series of processing without executing the process of step S180. That is, when the driver does not permit the transmission of the video data, the navigation device 120 terminates this series of processing without transmitting the video data to the data center 200.

The processes from step S100 to step S130 correspond to the processing executed for the second vehicle 102 shown in the lower part of FIG. 3. The processes from S140 to S180 correspond to the processing executed for the first vehicle 101 shown in the upper part of FIG. 3. That is, depending on the situation, the vehicle 100 may act as the first vehicle 101 that provides the video data or may act as the second vehicle 102 that is provided with the video data.

Processing Executed by Data Center 200 When Arrival Information is Received

Figure 5:
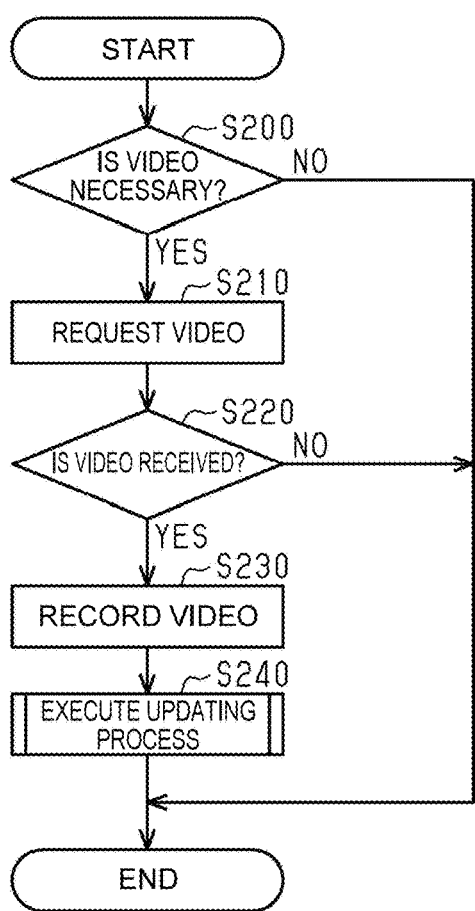
FIG. 5 is a flowchart showing a flow of processing executed by the data center when the data center receives arrival information in the navigation system of the embodiment.

FIG. 5 shows the flow of a series of processing executed by the data center 200 when receiving the arrival information. This series of processing is executed by the processing device 210 of the data center 200. This series of processing corresponds to processing executed by the data center 200 when the data center 200 receives the arrival information from the first vehicle 101, as shown in the upper part of FIG. 3.

As shown in FIG. 5, when starting this series of processing, the processing device 210 first determines whether or not the video is necessary in the process of step S200. For example, the processing device 210 determines that the video is necessary when the video data corresponding to the destination included in the arrival information is not stored in the storage device 220. The processing device 210 also determines that the video is necessary when the video data is old even in the case in which the video data corresponding to the destination included in the arrival information is stored in the storage device 220. On the other hand, the processing device 210 determines that the video is unnecessary when the video data corresponding to the destination included in the arrival information is just updated through the updating process in step S240, which will be described later, for example.

In the process of step S200, when the processing device 210 determines that the video is necessary (YES in step S200), the process proceeds to step S210. In the process of step S210, the processing device 210 transmits a video request to the vehicle 100 that has transmitted the arrival information to request this vehicle to provide the video data.

In the process of next step S220, the processing device 210 determines whether or not the video data is received. In the process of step S220, when the processing device 210 determines that the video data is received (YES in step S220), the process proceeds to step S230. The video data received by the data center 200 is the video data received from the first vehicle 101 in FIG. 3. This data is data of a video captured by the drive recorder 110 during a time period from the termination of the route guidance until the arrival of the first vehicle 101 at the destination.

In the process of step S230, the processing device 210 stores the received video data in the storage device 220. In the process of next step S240, the processing device 210 executes the updating process. The updating process is a process of evaluating the video data that is newly stored and updating the video data to be provided to the second vehicle 102. The processing device 210 compares the received video data with video data already accumulated in the storage device 220 as video data to be provided to the second vehicle 102 and updates the video data to be provided to the second vehicle 102 depending on the result of this comparison. The processing device 210 preferably adopts video data in which the vehicle has reached the destination via a shorter route. For this reason, for example, the processing device 210 selects data having a shorter video length as the video data to be provided to the second vehicle 102. That is, the processing device 210 selects video data having a short time from the termination of the route guidance around the destination until the arrival at the destination. The processing device 210 preferably adopts new video data. Hence, for example, the processing device 210 selects newer data as the video data to be provided to the second vehicle 102.

The updating process may be executed after a plurality of pieces of video data regarding the same destination is accumulated in the storage device 220. In this case, the processing device 210 selects one piece of video data from the plurality of pieces of video data regarding the same destination and updates the video data to be transmitted to the second vehicle 102. For example, the updating process may be a process configured such that the processing device 210 shows the video data accumulated in the storage device 220 to an operator and allows the operator to select one piece of the video data. For example, the updating process may be a process configured such that the processing device 210 selects data that matches predetermined conditions including a data size and a shooting date and time.

The data center 200 might receive video data transmitted from a vehicle 100, which has arrived at the destination after getting lost. The data center 200 might also receive video data transmitted from a vehicle 100 that has arrived at the destination after passing through an extremely narrow road through which a vehicle with a general vehicle-width cannot pass. The data center 200 might receive such data that is inappropriate as the video data to be transmitted to the second vehicle 102. For this reason, when the processing device 210 determines that the received video data is significantly different from the plurality of pieces of video data regarding the same destination accumulated in the storage device 220, the processing device 210 deletes this received video data. Such a determination may be made, for example, based on the result of the determination made by the operator as described above. Such a determination may be made, for example, by the processing device 210 using AI that analyzes the video data and based on the result of this analysis.

After executing the updating process in step S240 and storing the video data in the storage device 220, the processing device 210 terminates this series of processing.

In the process of step S200, when the processing device 210 determines that the video is unnecessary (NO in step S200), the processing device 210 immediately terminates this series of processing. That is, in this case, the processing device 210 terminates this series of processing without executing the processes from step S210 to step S240. Further, in the process of step S220, when the processing device 210 determines that the video data cannot be received (No in step S220), the processing device 210 terminates this series of processing. That is, in this case, the processing device 210 terminates this series of processing without executing the process of step S230 and the process of step S240.

Processing Executed by Data Center 200 When Video Request is Received

Figure 6:
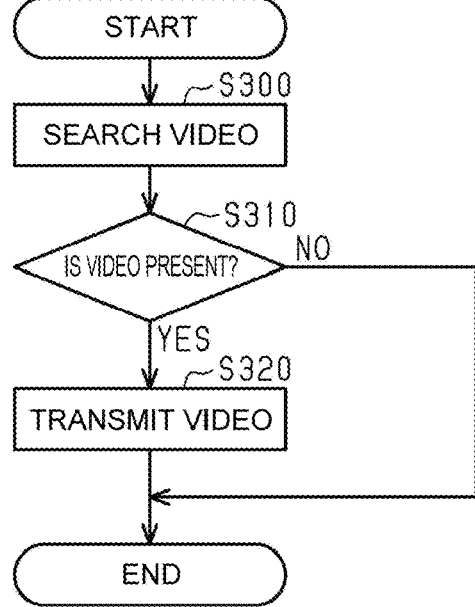
FIG. 6 is a flowchart showing a flow of processing executed by the data center when the data center receives a video request in the navigation system of the embodiment.

FIG. 6 shows the flow of a series of processing executed by the data center 200 when a video request is received. This series of processing is executed by the processing device 210 of the data center 200. This series of processing corresponds to processing executed by the data center 200 when the data center 200 receives the video request from the second vehicle 102, as shown in the lower part of FIG. 3.

As shown in FIG. 6, when this series of processing is started, in the process of step S300, the processing device 210 first searches the plurality of pieces of video data stored in the storage device 220 for video data to be provided to the second vehicle 102. Specifically, the processing device 210 searches for the video data based on the destination information included in the video request.

In the process of next step S310, the processing device 210 determines whether or not there is video data to be provided to the second vehicle 102 that has transmitted the video request. Specifically, when no data of a video captured under the condition where the same destination as that of the second vehicle 102 which has transmitted the video request is set is stored in the storage device 220, the processing device 210 determines that there is no video data to be provided to the second vehicle 102. When corresponding video data is stored in the storage device 220, the processing device 210 determines that there is video data to be provided to the second vehicle 102 that has transmitted the video request.

In the process of step S310, when the processing device 210 determines that there is video data to be provided to the second vehicle 102 that has transmitted the video request (YES in step S310), the process proceeds to step S320. In the process of step S320, the processing device 210 transmits the corresponding video data to the second vehicle 102 that has transmitted the video request. After transmitting the video data in this manner, the processing device 210 terminates this series of processing.

On the other hand, in the process of step S310, when the processing device 210 determines that there is no video data to be provided to the second vehicle 102 that has transmitted the video request (NO in step S310), the processing device 210 terminates this series of processing. That is, in this case, the processing device 210 terminates this series of processing without transmitting the video data to the second vehicle 102.

Operation of Embodiment

In the navigation system 10, the processing device 210 of the data center 200 receives the video captured by the drive recorder 110 from the first vehicle 101 through the series of processing as described with reference to FIG. 5, and stores the video in the storage device 220. This series of processing described with reference to FIG. 5 is the first step in the navigation method by the navigation system 10.

The processing device 210 then transmits the video stored in the storage device 220 to the second vehicle 102 through the series of processing described with reference to FIG. 6.

This series of processing described with reference to FIG. 6 is the second step in the navigation method by the navigation system 10.

After terminating the route guidance around the destination through the processes of steps S100 to S130 in the series of processing as described with reference to FIG. 4, the navigation device 120 of the vehicle 100 performs the route guidance while replaying the received video. That is, after terminating the route guidance around the destination, the navigation device 120 of the second vehicle 102 replays the video received from the data center 200 and performs the guidance to the destination. This series of processing is the third step in the navigation method by the navigation system 10.

The navigation system 10 executes the navigation method including the first step, the second step, and the third step in the above manner. By executing the above-described navigation method, after the route guidance using the map is terminated, the navigation system 10 replays the video captured by the drive recorder 110 of the first vehicle 101 and performs the guidance to the destination.

Effects of Embodiment (1) The navigation system 10 can perform the guidance to the destination while preventing misguidance to a wrong point.

(2) When performing the guidance to the destination by replaying the video, the navigation device 120 of the second vehicle 102 adjusts the replaying speed of the video in accordance with the speed of the second vehicle 102 such that a picture captured at a point that the second vehicle will reach after a predetermined time is displayed. Accordingly, the driver of the second vehicle 102 can easily grasp the appearance of the road and the positions of right and left turns on the way to this point that the second vehicle 102 will reach after the predetermined time.

(3) The processing device 210 of the data center 200 accumulates the plurality of pieces of video data regarding the same destination received from the plurality of first vehicles 101 in the storage device 220. The processing device 210 selects video data to be transmitted to the second vehicle 102 from the plurality of pieces of video data regarding the same destination stored in the storage device 220 and updates the video data to be transmitted to the second vehicle 102. Since the navigation system 10 updates the video, it is possible to prevent misguidance from being caused by an old video.

(4) In the case in which the map is updated or the animation to be displayed is updated as in the navigation device of related art, it is necessary to rewrite the map information or create a new animation. To the contrary, since the navigation system 10 uses the video data accumulated in the storage device 220, it is possible to quickly update the video used for the guidance. The navigation system 10 can increase the frequency of updating the information used for the guidance. Accordingly, the navigation system 10 can perform the guidance using new information.

(5) When the received video data is greatly different from the plurality of pieces of video data regarding the same destination accumulated in the storage device 220, this received data is likely to be inappropriate for use in the guidance.

The processing device 210 of the data center 200 compares the video data received from the first vehicle 101 with the plurality of pieces of video data regarding the same destination accumulated in the storage device 220. Then, when the processing device 210 determines that the received video data is significantly different from the plurality of pieces of video data regarding the same destination accumulated in the storage device 220, the processing device 210 deletes the received video data.

Accordingly, the navigation system 10 does not accumulate data likely to be inappropriate for use in the guidance, in the storage device 220. Therefore, the navigation system 10 can prevent the guidance using an inappropriate video from being performed. In addition, by avoiding accumulation of data likely to be inappropriate for use in the guidance in the storage device 220, it is possible to reduce the processing load for updating the video for use in the guidance executed by the processing device 210.

(6) In the above navigation method, after the route guidance using the map displayed on the navigation device 120 is terminated, the video captured by the drive recorder 110 of the first vehicle 101, which has once actually arrived at the destination, is replayed to perform the guidance to the destination. Accordingly, the above-described navigation method can perform the guidance to the destination while preventing misguidance to a wrong point.

Modifications

The present embodiment can be modified and implemented as follows. The present embodiment and the following modifications can be implemented in combination with each other as long as there is no technical contradiction.

In the above-described navigation system 10, the navigation device 120 inquires of the driver whether or not to permit transmission of the video data, and when the driver of the first vehicle 101 permits the transmission, the video data is transmitted. To the contrary, the navigation system 10 may employ a configuration to transmit the video data without requiring the permission of the driver.

In the above-described navigation system 10, the vehicle 100 sometimes behaves as the first vehicle 101 and sometimes behaves as the second vehicle 102, as described with reference to FIG. 4. To the contrary, among the vehicles 100, there may be some vehicles that are only provided with the video, that is, behave as the second vehicles 102. In this case, the vehicles that are only provided with the video do not have to include the drive recorders 110. The vehicles that are only provided with the video execute the processing including only the processes from step S100 to step S130, among the series of processing as described with reference to FIG. 4.

Among the vehicles 100, there may be some vehicles that only provide the video, that is, vehicles that behave only as the first vehicles 101. In this case, the vehicles that only provide the video execute the processing including only the processes from step S140 to step S180 in the series of processing as described with reference to FIG. 4.

What is claimed is:

1. A navigation system configured to be connected to a plurality of vehicles, the navigation system comprising:
    a storage device; and a processing device comprising at least one processor configured to:

receive, from a first vehicle among the plurality of vehicles, video data;

store the received video data in the storage device, the received video data being captured by a drive recorder of the first vehicle during a time period starting from termination of route guidance of the first vehicle until arrival of the first vehicle at a destination; and transmit the video data stored in the storage device to a second vehicle among the plurality of vehicles, the second vehicle having the destination set as a destination setting, wherein a video of the video data is played at the second vehicle for navigation to the destination after route guidance of the second vehicle is terminated.

2. The navigation system according to claim 1, wherein a playing speed of the video played at the second vehicle is adjusted in accordance with a speed of the second vehicle such that a picture captured at a point that the second vehicle reaches after a predetermined time is displayed.

3. The navigation system according to claim 1, wherein the at least one processor is configured to:

accumulate, in the storage device, a plurality of pieces of video data regarding a same destination received from two or more vehicles; and select video data to be transmitted to the second vehicle from the plurality of pieces of video data regarding the same destination accumulated in the storage device and update the video data to be transmitted to the second vehicle.

4. The navigation system according to claim 3, wherein the at least one processor is configured to:

compare the video data received from the first vehicle with the plurality of pieces of video data regarding the same destination accumulated in the storage device; and in response to a determination that the video data received from the first vehicle is different from the plurality of pieces of video data regarding the same destination accumulated in the storage device, delete the video data received from the first vehicle.

5. A method for a navigation system including a storage device and a processing device, the navigation system being configured to be connected to a plurality of vehicles, the method comprising:

receiving, from a first vehicle among the plurality of vehicles, a video;

storing the received video in the storage device, the received video being captured by a drive recorder of the first vehicle during a time period starting from termination of route guidance of the first vehicle until arrival of the first vehicle at a destination; and transmitting the video stored in the storage device to a second vehicle among the plurality of vehicles, the second vehicle having the destination set as a destination setting, wherein the video is played at the second vehicle for navigation to the destination after route guidance of the second vehicle is terminated.

6. The navigation system according to claim 1, wherein the route guidance of the first vehicle and the route guidance of the second vehicle are based on at least one of: a pre-stored map or a satellite-based system.

* * * * *